United States Patent [19]

Drude et al.

[11] 4,414,114
[45] Nov. 8, 1983

[54] DISCHARGE OF GASES FROM SUBMARINE DESALINATION PLANTS

[75] Inventors: Burkhard Drude; Thomas Peters, both of Erlangen, Fed. Rep. of Germany; Eberhard Klapp, deceased, late of Erlangen, Fed. Rep. of Germany, by Ursula Klapp, executrix

[73] Assignee: Mannesmann Aktiengesellschaft, Duesseldorf, Fed. Rep. of Germany

[21] Appl. No.: 137,242

[22] Filed: Apr. 4, 1980

Related U.S. Application Data

[63] Continuation of Ser. No. 83,762, Oct. 11, 1979, abandoned.

[30] Foreign Application Priority Data

Oct. 12, 1978 [DE] Fed. Rep. of Germany ....... 2844407

[51] Int. Cl.$^3$ .............................................. B01D 13/00
[52] U.S. Cl. .................................... 210/652; 137/572; 210/170; 210/188; 210/433.2

[58] Field of Search ..................... 137/1, 14, 171, 572, 137/575; 417/101, 102; 210/188, 321.1, 433.2, 170, 652

[56] References Cited

U.S. PATENT DOCUMENTS 2,096,034 10/1937 Fyke ................................... 417/102
2,583,062 1/1952 Riboud ........................... 137/171 X
3,857,350 12/1974 Roban ............................. 137/572 X Primary Examiner—Frank A. Spear, Jr.
Attorney, Agent, or Firm—Ralf H. Siegemund

[57] ABSTRACT

Gases which accumulate in a pressure vessel for the desalination of seawater are discharged into a second vessel and pressurized therein by means of the produced, high-pressure freshwater, for discharging gas into the surrounding sea, after which the freshwater used for pressurization is returned to the desalination vessel. An active system and a passive system are described.

7 Claims, 3 Drawing Figures

DISCHARGE OF GASES FROM SUBMARINE DESALINATION PLANTS

BACKGROUND OF THE INVENTION

The present invention relates to the discharge of gases from submarine desalination plants into the surrounding seawater (continuation of Ser. No. 083,762, filed Oct. 11, 1979, now abandoned).

Submarine desalination plants operate, for example, on the basis of reverse osmosis. Gases which are dissolved in the seawater being desalinated are frequently collected in the pressure vessel of that plant. These gases may interfere with the operation of the plant in that they reduce the transmembrane pressure differential. Moreover, during particular, undesired, operational states, such as a strong movement of the vessel, a pulsating two-phase flow may be produced. Thus, it is necessary to remove these gases from the vessel more or less frequently. Since the entire equipment is located underwater, the gas removal must be carried out with simple, but highly reliable, equipment.

Th. Peters, E. Klapp, and B. C. Drude have reported a simple arrangement for the foregoing purpose (Feasibility Study on Submarine Units for Reverse Osmosis; Proc. 5th International Symposium on Fresh Water From the Sea, 4 (1976), pp. 365–375). Accordingly, the increase of the internal pressure in the vessel by such gases is prevented through a venting duct, leading to the surface. Another more or less obvious approach is to feed the gases into another vessel, to pressurize that vessel and to just discharge the pressurized gases from that other vessel.

None of these approaches constitutes a satisfactory solution to the problem. A venting duct is expensive; particularly so because it is subjected to a high, hydrostatic pressure in greater depth. Also, waves and a heavy sea are hard on such a duct. On the other hand, a compressor operating underwater has to overcome quite large pressure differentials and is difficult to power and to maintain.

DESCRIPTION OF THE INVENTION

It is an object of the present invention to provide a new and improved, simple, reliable, and inexpensive method for removing the gases developed as undesired by-products in submarine desalination plants.

In accordance with the preferred embodiment of the present invention, it is suggested to feed the undesired gases from a desalination vessel into a second vessel and to use pressurized freshwater produced to pressurize the gases in the second vessel. Subsequently, the pressurized gases are discharged into the surrounding sea, while the freshwater is reclaimed. The gas pressurization requires, of course, a development of excess pressure over the hydrostatic pressure of the surrounding sea.

The invention can be applied in other environments, provided a relatively high-pressure liquid is available to pressurize the gases discharged from a location in which their presence is undesirable. The gas discharge system can be an active one, but a passive system using check valves is quite feasible. Decisive is that the various valves are operated in such a fashion that seawater cannot flow into the freshwater system.

DESCRIPTION OF THE DRAWINGS

While the specification concludes with claims particularly pointing out and distinctly claiming the subject matter which is regarded as the invention, it is believed that the invention, the objects and features of the invention, and further objects, features, and advantages thereof, will be better understood from the following description taken in connection with the accompanying drawings in which:

Figure 1:
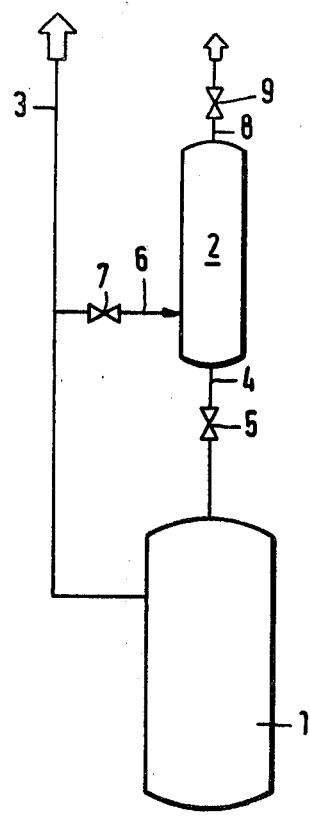
FIG. 1 is a schematic view of an equipment operating in accordance with the preferred embodiment of the invention.

Proceeding now to the detailed description of the drawings, reference numeral 1 refers to the pressure vessel of a desalination plant, and the gases to be removed are collected in that vessel. A pressure vessel 2 is connected to the top of vessel 1 by means of a valve 5 and a conduit 4. Freshwater is discharged from vessel 1 by means of a pump that is usually provided in such a vessel, and via reverse osmosis (see literature citation above) via duct 3, leading to a freshwater tank, or the like. It is presumed that the freshwater in duct 3 is highly pressurized. Vessel 2 is also connected to that duct, via a conduit 6 and a valve 7.

A third connection from vessel 2 includes a conduit 8 and a valve 9, for obtaining a discharge flow into the surrounding sea. Conduits 6 and 8 are to be traversed in but one direction, respectively to and from vessel 2, as seawater must not be fed to duct 3. Thus, check valves (not shown) may be included in conduits 6 and 8. This, however, is an added precaution and backup. Programmed control of valves 7 and 9 constitutes the main safety feature along that line.

The system operates in accordance with the following program. In the first phase, valve 5 opens so that gas can flow from vessel 1 to vessel 2 via duct 4. Any product water that has gathered in vessel 2 flows back into vessel 1 at the same time. Shortly thereafter, valve 5 closes again. In the second phase, valve 7 opens (valves 5 and 9 are closed). High-pressure product water enters vessel 2 from duct 3 and compresses the gas trapped in vessel 2. In the third phase, valve 9 opens while valve 7 remains open (valve 5 is closed), and the compressed gas is discharged via conduit 8; shortly thereafter, valves 7 and 9 close to complete the cycle.—This cycle of three steps or phases is repeated, whenever needed.

Certain details are of interest. Duct 6 and valve 7 have a respectively considerably smaller inner diameter than duct 8 and valve 9. This way, one makes sure that freshwater will enter vessel 2 from duct 3 rather slowly, after the compressed gas has been discharged. Thus, only very little product water will be lost.

Figure 2:
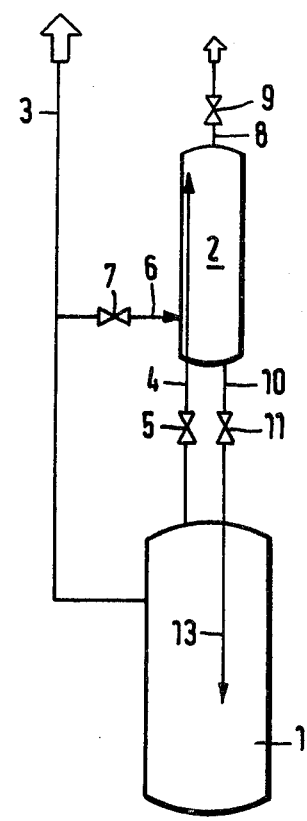
FIG. 2 is a schematic view of a system being modified and improved upon over the system shown in FIG. 1.

During the first phase, the freshwater, which has remained in vessel 2 from the previous second phase, flows back into vessel 1, but that flow must not be impeded by the counterflow of gas. Therefore, it may be advisable to use two pipes, as shown in FIG. 2. The first pipe or conduit 4 with valve 5 has an extension to feed the gas immediately to the top of vessel 2. The upper end of that pipe ends above the water level in vessel 2. The second pipe, 10, with valve 11 has an extension 13 to feed the water from vessel 2 immediately into deeper regions of vessel 1, possibly right to the bottom thereof. Pipe or conduit 10 begins at the bottom of vessel 2, while pipe or conduit 5 begins at the top of vessel 1.

The arrangement of FIG. 2 has the added advantage that the water level difference in the two vessels 1 and 2 causes the gases to be sucked out of vessel 1 into vessel 2 via conduit 4. Valves 5 and 11 operate in unison. Moreover, the two conduits between vessels 1 and 2 may include check valves.

Figure 3:
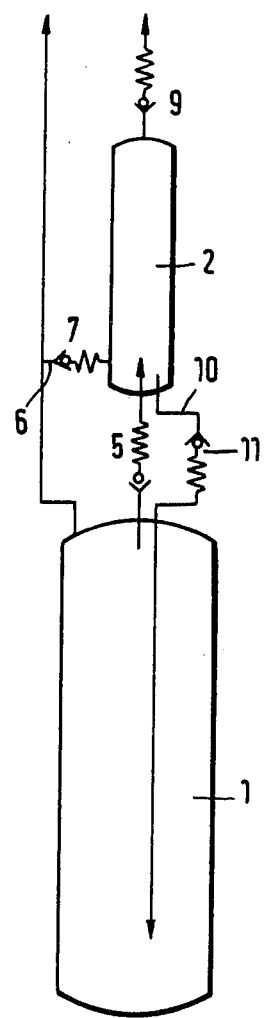
FIG. 3 is a schematic view of a system similar to FIG. 2, but operating on a passive rather than active basis.

The systems described above are active systems as far as valve control is concerned. As indicated schematically in FIG. 3, the valves of FIGS. 1 and 2 can be replaced by check valves 5', 7', 9', and 11' to obtain a passive system. These valves open and close automatically on the basis of the pressure conditions as directly effective on the valves. However, the check valves must be linked to make sure that certain valve states cannot occur in combination, to wit valves 5' and 11' must not be open when either one of the valves 7' and 9' is open.

Let $P_1$, $P_2$, and $P_3$ be respectively the pressure in vessels 1 and 2 and duct 3. $P_0$ is the pressure of the surrounding seawater (specifically as effective at the discharge end of duct 8). Also, conduit 6 is considerably narrower than duct 8 as far as flow passage is concerned. Conduit 10 has such a high flow resistance that, even under high pressure, only very little water can flow through.

At a time $T_0$, all valves are presumed to be closed and $P_1 = P_2$. As pressure $P_1$ in vessel 1 rises (possibly above a certain threshold), $P_1 > P_2$ and valve 5' opens so that gas is discharged from vessel 1 into vessel 2. Freshwater seeps from vessel 2 to vessel 1 on account of the static water pressure difference (level difference). Soon, the pressure has equalized in the two vessels ($P_1 = P_2$) and valve 5' closes.

The valves are interlinked in that valve 7' cannot possibly open as long as valve 5' is open. As the latter closes, valve 7' can (and will) open because $P_3 >> P_2$. Accordingly, vessel 2 is pressurized. As soon as $P_2 > P_0$, valve 9' opens and remains open for the discharge of compressed gas from vessel 2, until $P_2 = P_0$. Valves 7' and 9' close simultaneously and valve 11 opens so that water will seep again through duct 10 until $P_2 = P_1$ for closing valve 11'. It can thus be seen that valve 7' requires latching and unlatching. It is latched when valve 9' recloses following the discharge of vessel 2. Valve 7' is unlatched by valve 5' upon reclosing thereof during the next cycle.

The cycle time is basically given by the time it takes to obtain a significantly high pressure $P_1$ in vessel 1 ($P_1 > P_2$) from which is subtracted the period it takes to obtain $P_1 = P_2$ during the water discharge phase.

We claim:

1. Method of discharging gases from a deep-sea submarine desalination vessel which provides freshwater under high pressure, comprising the steps of
    intermittently discharging the gases from the vessel into a second vessel;
    using the pressurized freshwater for pressurizing the gas in the second vessel; and
    discharging the pressurized gas from the second vessel into the surrounding sea.

2. Method as in claim 1 and including the additional step of returning freshwater used for the pressurizing, to the desalination vessel.

3. Method as in claim 1 and including the step of blocking a connection from the desalination vessel to the second vessel at least during the pressurizing and discharging steps.

4. Method of discharging gases from a submarine vessel into the surrounding water of higher pressure, comprising the steps of
    intermittently pressurizing the gases by means of a pressurized liquid; and
    discharging the pressurized gas into the medium.

5. Method as in claim 4, wherein the gases are pressurized in, and after having been fed to, a second vessel.

6. Method as in claim 4, said pressurized liquid being taken from the vessel.

7. Method as in claim 1, wherein said desalination vessel provides for desalination on the basis of reverse osmosis.

* * * * *